US012051579B2

(12) United States Patent
Senko et al.

(10) Patent No.: US 12,051,579 B2
(45) Date of Patent: Jul. 30, 2024

(54) CHARGE DETECTION MASS SPECTROMETRY UTILIZING HARMONIC OSCILLATION AND SELECTIVE TEMPORAL OVERVIEW OF RESONANT ION (STORI) PLOTS

(71) Applicants: Thermo Finnigan LLC, San Jose, CA (US); Thermo Fisher Scientific (Bremen) GmbH, Bremen (DE)

(72) Inventors: Michael W. Senko, Sunnyvale, CA (US); Ping F. Yip, Salem, MA (US); Dmitry E. Grinfeld, Bremen (DE); Steven C. Beu, Austin, TX (US)

(73) Assignees: Thermo Finnigan LLC, San Jose, CA (US); Thermo Fisher Scientific (Bremen) GmbH, Bremen (DE)

( * ) Notice: Subject to any disclaimer, the term of this patent is extended or adjusted under 35 U.S.C. 154(b) by 451 days.

(21) Appl. No.: 17/606,386

(22) PCT Filed: Apr. 22, 2020

(86) PCT No.: PCT/US2020/029402
§ 371 (c)(1),
(2) Date: Oct. 25, 2021

(87) PCT Pub. No.: WO2020/219605
PCT Pub. Date: Oct. 29, 2020

(65) Prior Publication Data

US 2022/0246414 A1 Aug. 4, 2022

Related U.S. Application Data

(60) Provisional application No. 62/838,849, filed on Apr. 25, 2019.

(51) Int. Cl.
*H01J 49/00* (2006.01)
*H01J 49/42* (2006.01)

(52) U.S. Cl.
CPC ...... *H01J 49/0036* (2013.01); *H01J 49/0031* (2013.01); *H01J 49/4245* (2013.01)

(58) Field of Classification Search
CPC . H01J 49/0036; H01J 49/0031; H01J 49/4245
(Continued)

(56) References Cited

U.S. PATENT DOCUMENTS 6,124,591 A 9/2000 Schwartz et al.
2011/0240841 A1 10/2011 Lange
(Continued)

OTHER PUBLICATIONS

Kafader, et al ("STORI Plots Enable Accurate Tracking of Individual Ion Signals," J. Am. Mass Spectrom. (2019 30:2200-2203) (Year: 2019).*
(Continued)

*Primary Examiner* — Michael Maskell
(74) *Attorney, Agent, or Firm* — Klarquist Sparkman, LLP

(57) ABSTRACT

Apparatus and methods for performing charge detection mass spectrometry for measurement of the mass of a single ion of interest are disclosed. The ion of interest is caused to undergo harmonic oscillatory movement in the trapping field of an electrostatic trap, such that an image current detector generates a time-varying signal representative of the ion's oscillatory movement. This time-varying signal (transient) is processed (e.g., via a Fourier transform) to derive the ion's frequency and consequently determine the ion's mass-to-charge ratio (m/z). Ion charge is determined by construction of a Selective Temporal Overview of Resonant Ion (STORI) plot, which tracks the temporal evolution of signals attributable to the ion of interest, and where the slope of the STORI plot is related to the charge. The STORI plot may also be employed to identify ion decay events during transient acquisition and/or the presence of multiple ions of the same mass or non-resolvable ions.

23 Claims, 3 Drawing Sheets

(58) Field of Classification Search
USPC .................................................. 250/281, 282
See application file for complete search history.

(56) References Cited

U.S. PATENT DOCUMENTS

| | | | |
|---|---|---|---|
| 2014/0142865 | A1 | 5/2014 | Wright |
| 2017/0205425 | A1 | 7/2017 | Yip et al. |
| 2018/0061625 | A1 | 3/2018 | Weisbrod et al. |

OTHER PUBLICATIONS

Kafader, et al, "STORI plots enable accurate tracking of individual ion signals" (Year: 2019).*

* cited by examiner

CHARGE DETECTION MASS SPECTROMETRY UTILIZING HARMONIC OSCILLATION AND SELECTIVE TEMPORAL OVERVIEW OF RESONANT ION (STORI) PLOTS

BACKGROUND OF THE INVENTION

Field of the Invention

The invention relates generally to mass spectrometry, and more particularly to apparatus and methods for measurement of the mass-to-charge ratio and charge of a single ion.

Description of Related Art

Charge detection mass spectrometry (CDMS) is a technique where the masses of individual ions are determined from concurrent measurement of each ion's mass-to-charge ratio (m/z) and charge. One technique used in academic laboratories for CDMS, referred to as ion trap CDMS, employs an inductive detector positioned between two opposing electrostatic mirrors, as described in Fuerstenau and Benner, "Molecular weight determination of megadalton DNA electrospray ions using charge detection time-of-flight mass spectrometry", Rapid Communications in Mass Spectrometry 9:15 (1995), 1528-1538. In such instruments, an ion's m/z is determined by its oscillation frequency between the mirrors, while its charge is determined based upon the amplitude of the signal on the inductive detector. Separate and direct measurement of the charge thus overcomes a common challenge for large and/or heterogeneous analytes investigated with conventional electrospray mass spectrometry, where it may not be possible to separate incrementally charged ion species and thereby infer charge state.

Existing ion trap CDMS instrumentation presents several significant technical challenges. First, because the potential generated by opposing mirrors is generally anharmonic, the measured frequency is dependent on the initial kinetic energy of the ion. This may lead to poor m/z measurement accuracy for single particles, which also results in poor resolution when assembling a histogram of measured masses. In addition, the signal generated by the inductive detector is not sinusoidal, but processing of the signal is performed using Fourier transform analysis. The resultant signal is distributed among numerous harmonics, which significantly reduces overall system sensitivity. This imposes an additional restriction where only a single ion species can be analyzed at a time, leading to very long acquisition cycles. Finally, ions are moved directly in existing CDMS instrumentation from the source to the mirrors, without proper desolvation. The lack of desolvation may result in the observation of mass shifts during the measurement period as the ion loses solvent.

PCT Publication No. WO2019/231,854 by Senko et al. describes apparatus and methods intended to address the shortcomings of existing CDMS instrumentation and techniques. This publication discloses the use of an electrostatic trap to establish a trapping field that causes the trapped ions to undergo harmonic motion along a longitudinal axis, and an image current detector that generates a time-varying signal (also referred to as a transient) responsive to the longitudinal motion of the ions. The time-varying signal is subjected to a Fourier transform to determine the frequency and associated amplitude of at least one of the trapped ion species, and the m/z and charge of the trapped ion species are derived respectively from the determined frequency and amplitude. While this approach has been employed successfully under certain conditions for the measurement of the m/z and charge of high-mass ion species, it may be susceptible to error when ions decay during the transient acquisition period, or where multiple ions of the same ion species are present. Thus, the remains a need in the art for a CDMS apparatus and method that avoids or minimizes the errors that may occur when using the technique described in the Senko et al. publication.

SUMMARY OF THE INVENTION

Roughly described, an apparatus is disclosed for measurement of the m/z and charge of an ion, and consequently its mass, by processing an image current signal induced by the ion's oscillatory movement within an electrostatic trap to generate a Selective Temporal Overview of Resonant Ion (STORI) plot, which is defined hereinbelow. The electrostatic trap includes a plurality of electrodes to which non-oscillatory voltages are applied. The electrodes are shaped and arranged to establish an electrostatic trapping field that has causes the ion to undergo harmonic motion with respect to a longitudinal axis of the trap. The apparatus further includes a detector that generates a time-varying signal representative of the current induced on the detector by the harmonic longitudinal motion of the ion. A data system receives the time-varying signal from the detector, and processes the signal to determine the ion's m/z and charge. The determination of m/z is accomplished by applying a discrete Fourier transform to the time-varying signal to precisely identify the frequency ω of the ion's harmonic motion. The determination of ion charge may be effected by construction of a Selective Temporal Overview of Resonant Ion (STORI) plot, which constitutes a plot of the value of $STORI_{MAG}$ versus time. Each point in a STORI plot is the product of the discretized time-varying signal S at time $t_n$, and either a sine wave (equation 1, below) or cosine wave (equation 2, below) at the frequency of interest (w), summed with the prior STORI point obtained at prior time point $t_{n-1}$, as expressed in the following equations.

$$STORI_{REAL}(t_n)=S(t_n)*\sin(\omega*t_n)+STORI_{REAL}(t_{n-1}) \quad (1)$$

$$STORI_{IMAG}(t_n)=-S(t_n)*\cos(\omega*t_n)+STORI_{IMAG}(t_{n-1}) \quad (2)$$

and $$STORI_{MAG}(t_n)=((STORI_{REAL}(t_n))^2+(STORI_{IMAG}(t_n))^2)^{1/2} \quad (3)$$

The ion's charge is determined in accordance with the measured slope of the STORI plot and calibration data that relates the STORI plot slope to ion charge. In addition to the determination of the charge(s) of one or more of the trapped ion species, the STORI plot may be employed to identify and characterize ion decay events (where an ion species disintegrates during the acquisition of the time-varying signal, as well as to identify and evaluate signals produced by two or more simultaneously trapped ions.

Once an ion's m/z and charge are determined using these processing methods, the ion's mass may be easily calculated from the product of the two values.

In more specific embodiments, the electrostatic trap is formed from coaxially arranged inner and outer electrodes, each elongated along a longitudinal axis, and the ion is trapped in the annular space between the electrodes. The inner and outer electrodes may be shaped and arranged to establish a quadro-logarithmic field in the annular space, such that the restorative force exerted by the field along the central axis is proportional to the position of the ion along the central axis relative to a transverse plane of symmetry. The outer electrode may be split in half along the transverse plane of symmetry into first and second parts, and the detector may comprise a differential amplifier connected across the first and second parts. The ion may be trapped in an ion store prior to release to the electrostatic trap to reduce its kinetic energy and promote complete desolvation. Analysis of two or more ion species may be performed simultaneously within the electrostatic trap, such that the data system constructs multiple STORI plots, with each STORI plot being calculated using the frequency of motion of a different individual ion species, such that charge state may be determined for each of the multiple trapped ion species. The STORI plot may be evaluated to determine whether two or more ions of the same ion species were present in the mass analyzer.

Embodiments of the invention further include a method for measuring the m/z and charge of an ion. According to this method, an ion population including an ion of interest is injected into a trapping region, wherein an electrostatic trapping field is established that causes the ion population to undergo harmonic motion along a central axis. A time-varying signal is generated representing the current induced on a detector by the harmonic motion. The time-varying signal is processed to derive the frequency of harmonic motion of the ion of interest, which in turn is used to determine the ion's m/z. The time varying signal is also processed to generate a STORI plot for the ion of interest in the manner described above, and the ion's charge state is determined from the slope of the STORI plot.

DETAILED DESCRIPTION

Described hereinbelow are specific embodiments of the present invention, which are intended to be illustrative rather than limiting. Those skilled in the art will recognize that the various features, structures, steps and limitations disclosed in connection with discrete embodiments may be combined or varied without departing from the scope of the invention.

Figure 1:
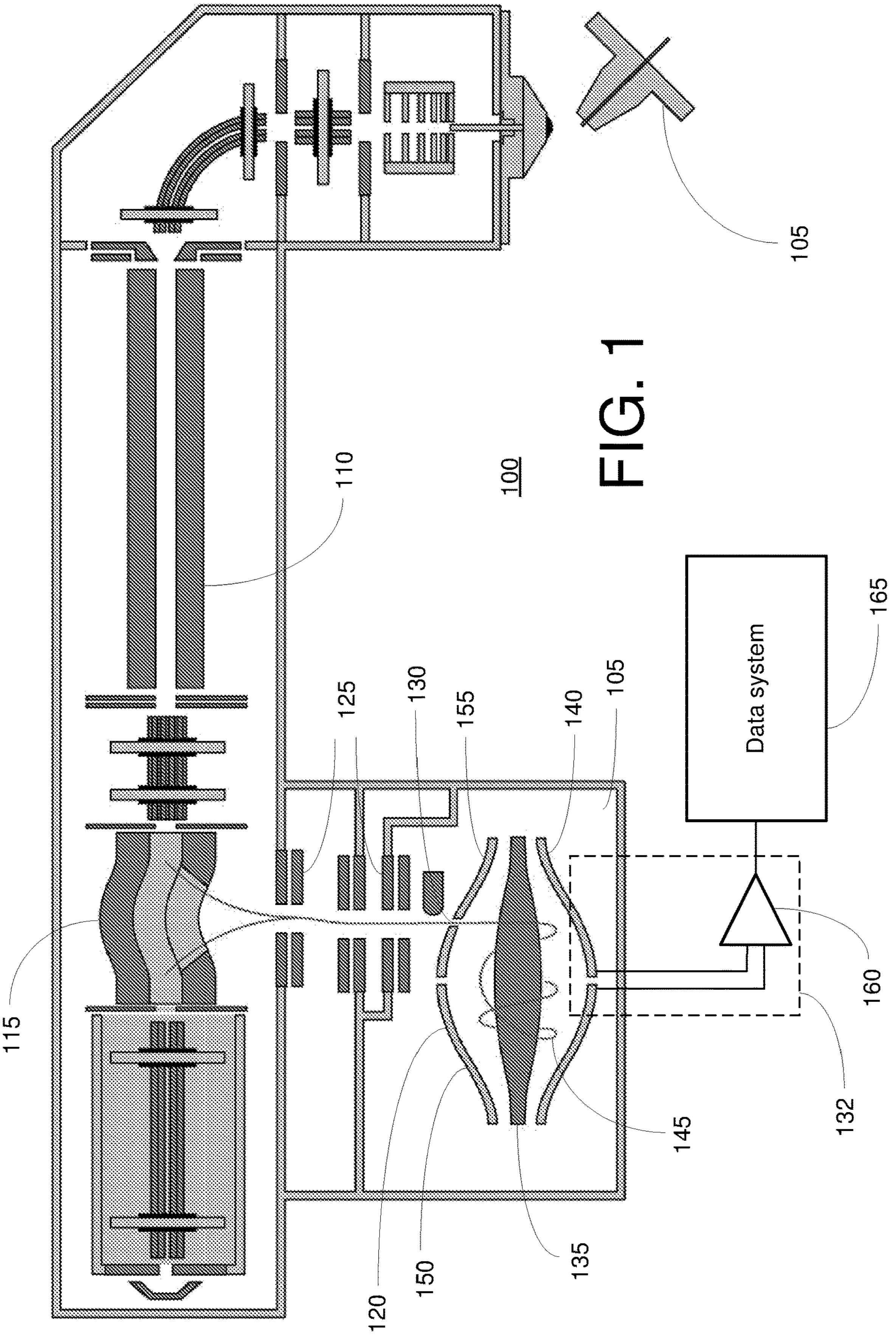
FIG. 1 is a symbolic diagram of an apparatus for concurrent measurement of the m/z and charge of an ion, in accordance with an embodiment of the invention.

FIG. 1 symbolically depicts a mass spectrometry apparatus 100 arranged in accordance with one embodiment of the present invention. Apparatus 100 includes an ionization source 105 that generates ions from a sample to be analyzed. As used herein, the term "ion(s)" refers to any charged molecule or assembly of molecules, and is specifically intended to embrace high molecular weight entities sometimes referred to in the art as macro-ions, charged particles, and charged aerosols. Without limiting the scope of the invention, ions that may be analyzed by apparatus 100 include proteins, protein complexes, antibodies, viral capsids, oligonucleotides, and high molecular weight polymers. Source 105 may take the form of an electrospray ionization (ESI) source, in which the ions are formed by spraying charged droplets of sample solution from a capillary to which a potential is applied. The sample may be delivered to source 105 as a continuous stream, e.g., as the eluate from a chromatographic column.

Ions generated by source 105 are directed and focused through a series of ion optics disposed in vacuum chambers of progressively reduced pressures. As depicted in FIG. 1, the ion optics may include ion transfer tubes, stacked ring ion guides, radio-frequency (RF) multipoles, and electrostatic lenses. The vacuum chambers in which the ion optics are contained may be evacuated by any suitable pump or combination of pumps operable to maintain the pressure at desired values.

Apparatus 100 may additionally include a quadrupole mass filter (QMF) 110 that transmits only those ions within a selected range of values of m/z. The operation of quadrupole mass filters is well known in the art and need not be discussed in detail herein. Generally described, the m/z range of the selectively transmitted ions is set by appropriate adjustment of the amplitudes of the RF and resolving direct current (DC) voltages applied to the electrodes of QMF 110 to establish an electric field that causes ions having m/z's outside of the selected range to develop unstable trajectories. The transmitted ions may thereafter traverse additional ion optics (e.g., lenses and RF multipoles) and enter ion store 115. As is known in the art, ion store 115 employs a combination of oscillatory and static fields to confine the ions to its interior. In a specific implementation, ion store 115 may take the form of a curved trap (referred to colloquially as a "c-trap") of the type utilized in Orbitrap mass spectrometers sold by Thermo Fisher Scientific. The curved trap is composed of a set of generally parallel rod electrodes that are curved concavely toward the ion exit. Radial confinement of ions within ion store 115 may be achieved by applying oscillatory voltages in a prescribed phase relationship to opposed pairs of the rod electrodes, while axial confinement may be effected by applying static voltages to end lenses positioned axially outwardly of the rod electrodes.

Ions entering ion store 115 may be confined therein for a prescribed cooling period in order to reduce their kinetic energies prior to introduction of the ions into electrostatic trap. Confinement of the ions within the ion store for a prescribed period may also assist in desolvation of the ions, i.e., removal of any residual solvent moieties from the analyte ion. As discussed hereinabove, the presence of residual solvent may result in mass shifts during analysis which interfere with the ability to accurately measure m/z and charge. To facilitate kinetic cooling and desolvation of the ions, an inert gas such as argon or helium may be added to the ion store internal volume; however, the cooling gas pressure should be regulated to avoid unintended fragmentation of the analyte ions and/or excessive leakage of the gas into electrostatic trap 120. The duration of the cooling period will depend on a number of factors, including the kinetic energy of ions entering ion store 115, the inert gas pressure, and the desired kinetic energy profile of ions injected into electrostatic trap 120. After the cooling period has been completed, ions confined in ion store 115 may be radially ejected from ion store toward entrance lenses 125, which act to focus and direct ions into inlet 130 of electrostatic trap 120. Rapid ejection of ions from ion store 115 may be performed by rapidly collapsing the oscillatory field within the ion store interior and applying a DC pulse to the rod electrodes positioned away from the direction of ejection.

To reliably measure ion charge using the CDMS technique, only individual ions of a particular ion species can be present in electrostatic trap 120 during a measurement event. As used herein, the term "ion species" refers to an ion of a given elemental/isotopic composition and charge state; ions of different elemental/isotopic compositions are considered to be different ion species, as well as are ions of the same elemental composition but different charge states. The term "ion species" is used interchangeably herein with the terms "analyte ion(s)" and "ion(s) of interest". If multiple ions of the same ion species are present during a measurement event, then the measured charge state (determined from the amplitude of the signal generated by image current detector 132, as described below) will be a multiple of the actual charge state of an individual ion. To avoid this type of mismeasurement, the ion population within ion store 115 should be kept sufficiently small such that the likelihood that two ions of the same ion species are confined within the ion store is maintained at an acceptable minimum. This may be accomplished by attenuation of the ion beam generated by source 105 (more specifically, by "detuning" ion optics located in the upstream ion path such that high losses of ions occur) and/or via regulation of the fill time (the period during which ions are accepted into ion store 115). To control the fill time, one or more ion optic components located upstream in the ion path of ion store may be operated as a gate to selectively allow or block passage of ions into the internal volume of ion store 115.

Electrostatic trap 120 may take the form of an orbital electrostatic trap, of the type commercially available from Thermo Fisher Scientific under the trademark "Orbitrap" and depicted in cross-section in FIG. 1. Such orbital electrostatic traps include an inner spindle-type electrode 135 defining a central longitudinal axis, designated in a cylindrical coordinate system as the z-axis. An outer barrel-type electrode 140 is positioned coaxially with respect to inner electrode 135, defining therebetween a generally annular trapping region 145 into which ions are injected. Inner electrode 135 and outer electrode 140 are each symmetrical about a transverse plane (designated as z=0, and alternatively referred to as the "equator"), with inner electrode 135 having a maximum outer radius of $R_1$ and outer electrode 140 having a maximum inner radius of $R_2$ at the transverse plane of symmetry. As has been discussed widely in the scientific literature (see, e.g., Makarov, "Electrostatic Axially Harmonic Orbital Trapping: A High-Performance Technique of Mass Analysis", Analytical Chemistry, Vol. 72, No. 6, pp. 1156-62 (2000), which is incorporated herein by reference), the inner and outer electrodes may be shaped to establish (upon application of electrostatic voltage(s) to one or both of the electrodes) an electrostatic potential U(r,z), within trapping region 145 that approximates the relation:

$$U(r, z) = \frac{k}{2}\left(z^2 - \frac{r^2}{2}\right) + \frac{k}{2} * (R_m) * \ln\left(\frac{r}{R_m}\right) + C$$

where r and z are cylindrical coordinates (r=0 being the central longitudinal axis and z=0 being the transverse plane of symmetry), C is a constant, k is field curvature, and Rm is the characteristic radius. This field is sometimes referred to as a quadro-logarithmic field.

Outer electrode 140 is split along the transverse plane of symmetry into first and second parts 150 and 155, which are separated from each other by a narrow insulating gap. This arrangement enables the use of outer electrode 140, together with differential amplifier 160, as an image current detector. The presence of an ion proximal to the outer electrode induces a charge (of a polarity opposite to that of the ion) in the electrode having a magnitude proportional to the charge of the ion. The oscillatory back-and-forth movement of an ion along the z-axis between the first 150 and second 155 parts of outer electrode 140 causes image current detector 132 to output a time varying signal (referred to as a "transient") having a frequency equal to the frequency of the ion's longitudinal oscillation and an amplitude representative of the ion's charge.

Ions may be introduced tangentially into trapping region 145 through inlet aperture 130 formed in outer electrode 240. Inlet aperture 130 is axially offset (along the z-axis) from the transverse plane of symmetry, such that, upon introduction into trapping region 145, the ions experience a restorative force in the direction of the plane of symmetry, causing the ions to initiate longitudinal oscillation along the z-axis while orbiting inner electrode 135, as illustrated in FIG. 1. A salient characteristic of the quadro-logarithmic field is that its potential distribution contains no cross-terms in r and z, and that the potential in the z-dimension is exclusively quadratic. Thus, ion motion along the z-axis may be described as a harmonic oscillator (because the force along the z-dimension exerted by the field on the ion is directly proportional to the displacement of the ion along the z-axis from the transverse plane of symmetry) and is completely independent of the orbital motion. In this manner, the frequency of ion oscillation ω along the z-axis is simply related to the ion's mass-to-charge ratio (m/z) according to the relation:

$$\omega = \sqrt{\frac{k}{m/z}}$$

Measurement of charge state and m/z, and consequent calculation of the product mass, proceeds by the acquisition and processing of the transient. Transient acquisition by detector 132 is initiated promptly after injection of the analyte ion(s), and continued for a predetermined transient length. The transient length required for accurate measurement of m/z and charge state will vary according to the analyte, as well as the physical and operational parameters of electrostatic ion trap 120. In general, the transient will need to be of adequate duration to allow the signal to be reliably distinguished from noise. For a typical analyte ion, it is anticipated that a satisfactory signal-to-noise ratio may be achieved using a commercially-available orbital trapping mass analyzer at a transient length of 500 milliseconds. It will be understood that the maximum transient length will be limited by the duration for which the analyte ion is stably trapped within trapping region 145 without colliding with background gas atoms/molecules or other ions, which is in part a function of the trapping region pressure.

The transient signal produced by detector 132 is processed by data system 165, the functions of which will be described below in connection with FIG. 2. Although data system 165 is depicted as a unitary block, its functions may be distributed among several interconnected devices. Data system 165 will typically include a collection of specialized and general purpose processors, application specific circuitry, memory, storage, and input/output devices. Data system 165 is configured with logic, for example using executable software code, to perform a set of calculations to determine the fundamental frequency of the analyte ion's motion and to construct a STORI plot corresponding to the ion, which are used in turn to derive the m/z and charge state.

Figure 2:
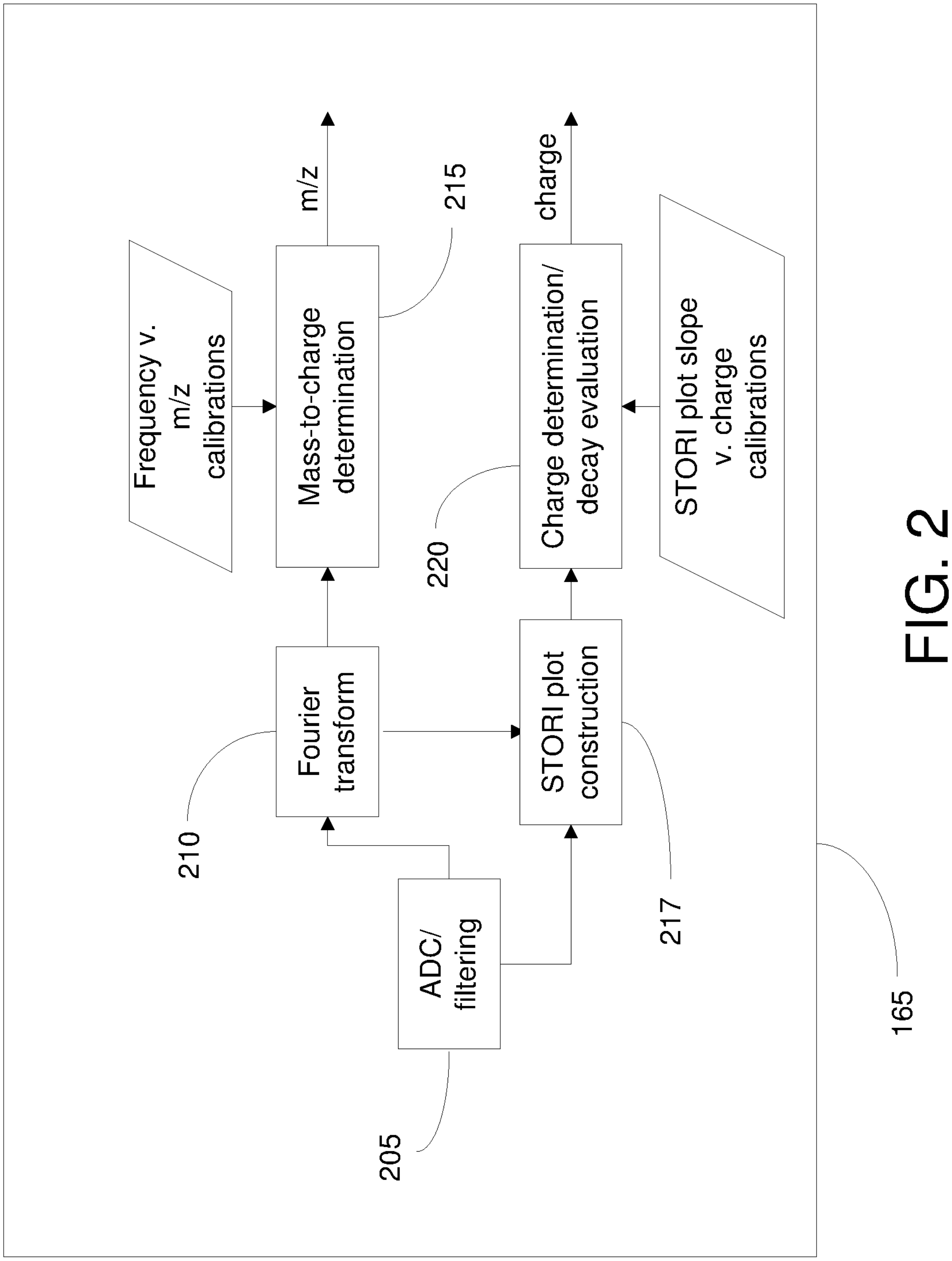
FIG. 2 is a block diagram depicting logical components of the data system of FIG. 1.

FIG. 2 depicts components of data system 165. Analog-to-digital converter (ADC) module 205 receives the analog signal generated by detector 132 and samples the signal at a prescribed sampling rate to generate a sequence of discrete time-intensity data values. ADC module 205 may also perform a filtering function to attenuate extraneous noise and improve signal-to-noise ratio. The time-domain data are then passed to Fast Fourier transform (FFT) module 210 for conversion of the data into the frequency domain. FFT algorithms are well known in the art and hence need not be discussed in detail herein. Generally described, an FFT algorithm rapidly computes the discrete Fourier transform (DFT) of a sequence by factorizing the DFT matrix into a product of sparse factors. FFT module 210 generates as output a frequency spectrum, representing the decomposition of the time-domain data sequence into one or more frequency components, each frequency component comprising a single sinusoidal oscillation with its own amplitude.

As noted above, the motion along the z-axis of an analyte ion trapped within the field generated in trapping region 145 is harmonic and may be represented as a simple sinusoidal function. The output of 1-1-T module 210 will thereby yield a frequency spectrum that has a strong peak at the fundamental frequency of oscillation w of the ion of interest. When multiple ion species are present within the electrostatic trap during the measurement event (i.e., during acquisition of a transient), then each ion species will exhibit a corresponding peak in the frequency spectrum. In contrast to prior art CDMS systems in which the oscillatory motion of a trapped ion is anharmonic and non-sinusoidal (for which the FFT output will include numerous peaks distributed among various harmonics), the signal for each ion species in the electrostatic trap 120 will be concentrated into a single peak appearing of the fundamental frequency of oscillation, thereby improving sensitivity and enabling charge measurement for lower-charge ions relative to prior art CDMS devices.

The frequency spectrum generated by FFT module is provided as input to m/z determination module 215, which processes the frequency spectrum to determine the m/z of the analyte ion(s). M/z determination module 215 is configured to identify, for the or each analyte ion species present in the spectrum, the fundamental frequency of oscillation of the analyte ion. This frequency is then converted to a value of m/z. As noted above, the frequency of oscillatory ion motion along the z-axis is inversely proportional to the square root of the ion's m/z in accordance with the relation:

$$\omega = \sqrt{\frac{k}{m/z}}$$

Thus, the m/z may be determined from the measured ion frequency using an empirically established frequency vs. m/z calibration curve generated by fitting an inverse square-root curve to data points acquired for analyte ions of known m/z, as is known in the art.

As described in further detail hereinbelow, charge determination module 220 is configured to process the STORI plot(s) constructed by module 217 and provide as output, for the or each analyte ion species present in the spectrum, a value of the ion's charge.

Once the m/z and charge of the analyte ion has been determined, the mass of the ion may be calculated simply via the product of the determined m/z and charge. If the spectrum contains multiple ion species, the mass for each ion species is calculated by the product of the m/z and charge determined for that species.

In certain implementations, the transient acquisition and m/z and charge determination operations will be performed repeatedly for an analyte ion. The resultant calculated masses may be binned to obtain a mass histogram, with the peak of the histogram representing the most likely mass. Generally, the width of the histogram will depend on the accuracy of the image charge determination, with narrower widths being indicative of high accuracy. Other techniques, including averaging, may be employed to improve the reliability of mass determination.

Use of STORI Plots for Charge Determination in CDMS

In CDMS, the ability to assign charge, and thus mass, accurately is dependent on the ability to determine the amplitude of the signal corresponding to the ion of interest. In the case where the ion generates signal throughout the signal acquisition period, the determination of the signal amplitude is accomplished simply via the amplitude of the resulting peak in the frequency domain, as is described in the aforementioned Senko et al. publication.

However, ions may "decay" (disintegrate) during the acquisition period, resulting in the destabilization of the ion's trajectory. This can either be due to collision with a background gas molecule, or simply because the ion is metastable. If the ion decays during the acquisition period, less signal will be generated, with that signal being proportional to the lifetime of the ion. Therefore, in order to convert the frequency domain amplitude back to the undecayed time domain amplitude, one must be able to accurately determine the ion lifetime.

The traditional method for examining temporal changes in time domain data is to use Short Term Fourier Transforms (STFT). In this process, a fraction of the total data set is transformed to the frequency domain in a repeated fashion, with the window of data being slid or stepped through the entire time domain data set. STFT suffers from several disadvantages, including reduced sensitivity due to the use of smaller time domain data sets, along with a temporal resolution which is limited by the size of the time domain data set and the size of the steps taken during the processing.

An alternate technique for evaluating temporal changes in time domain data is described hereinbelow, and involves calculation (using the charge determination module described above, or such other data system component as may be suitable for the purpose) of a Selective Temporal Overview of Resonant Ion (STORI) plot, alternatively referred to as Correlated Integral Profile (CIP) processing. The calculation is similar to a discrete Fourier transform, where the time domain data is multiplied by a sine wave of the frequency of interest, and the output is the dot product of the two. Each point in a STORI plot is the product of the discretized time-varying signal S at time $t_n$, and either a sine wave (equation 1, below) or cosine wave (equation 2, below) at the frequency of movement of the ion of interest ω (determinable from the Fourier transform of the time-domain signal data), summed with the prior STORI point obtained at prior time point $t_{n-1}$, as expressed in the following equations.

$$\text{STORI}_{REAL}(t_n)=S(t_n)*\sin(\omega*t_n)+\text{STORI}_{REAL}(t_{n-1}) \quad (1)$$

$$\text{STORI}_{IMAG}(t_n)=-S(t_n)*\cos(\omega*t_n)+\text{STORI}_{IMAG}(t_{n-1}), \quad (2)$$

The foregoing components are each dependent on the initial phase of the signal, and thus neither component alone can provide quantitative information about the signal amplitude. The phase dependency of the signal can be removed by calculating the magnitude of the real and imaginary STORI components, as set forth below in equation (3):

$$STORI_{MAG}(t_n)=((STORI_{REAL}(t_n))^2+(STORI_{IMAG}(t_n))^2)^{1/2} \quad (3)$$

In the data system 165 depicted in FIG. 2, the foregoing calculations are performed by the operation of STORI plot construction module 217 (e.g., by execution of a set of software instructions), which receives the discretized time-domain signal data as input and outputs a representation of plot of $STORI_{MAG}$ versus time. Where multiple analyte ions of different masses are present and it is desired to separately determine mass for each of the multiple analyte ions, then a STORI plot is constructed for each analyte ion, in accordance with their individual frequencies of movement (which vary in relation to their m/z's as described above). The STORI plot(s) may then be utilized by charge determination/decay evaluation module 220 for determination of charge state, and for identification and characterization of ion decay events that occur during the acquisition of the time-varying signal. The STORI plot construction module 217 may also include logic for causing the calculated STORI plot to be visually displayed to the instrument operator on a monitor that constitutes part of data system 165.

Figure 4:
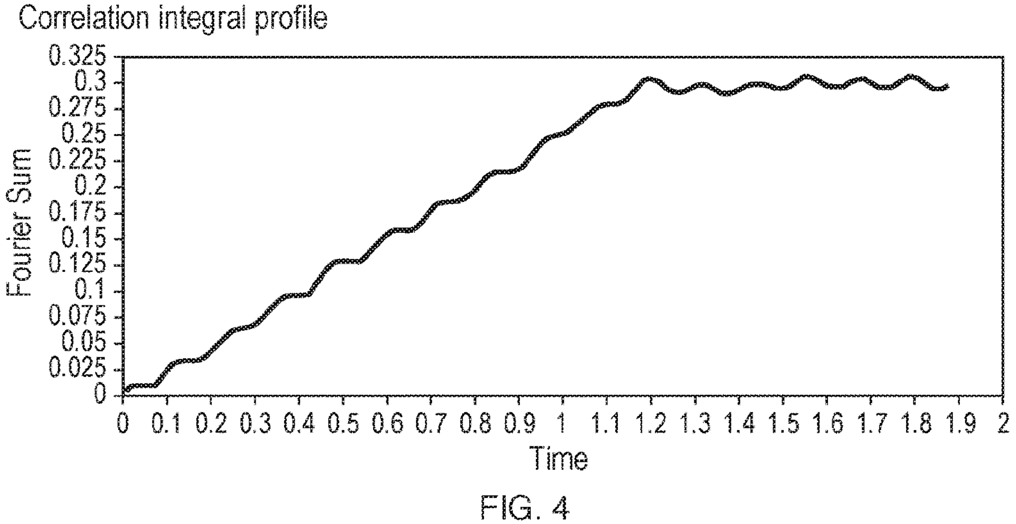
FIG. 4 is a depiction of a STORI plot for a single ion that decays during the signal acquisition period.

An example of a STORI plot for a single ion is depicted in FIG. 4, wherein the ion of interest generates signal over the entire signal acquisition period. In this STORI plot, the variation of $STORI_{MAG}$ with time approximates a straight line with a constant slope. The STORI plot slope is a measure of ion charge, with ions of higher charge exhibiting a steeper slope relative to ions of lower charge. Thus, the charge state of an ion can be determined based on the slope of this line. In the FIG. 2 configuration, the charge state determination is performed by module 220 using a set of stored empirically derived calibrations relating STORI plot slope and charge state obtained using analytes of known charge. Since the STORI plot slope v. charge relationship may vary according to the operating conditions of the mass analyzer (for example, the voltage applied to inner electrode 135), the calibration data may be multi-dimensional, with slope v. charge relationships empirically established for different values of instrument operating parameters across an expected range.

Figure 3:
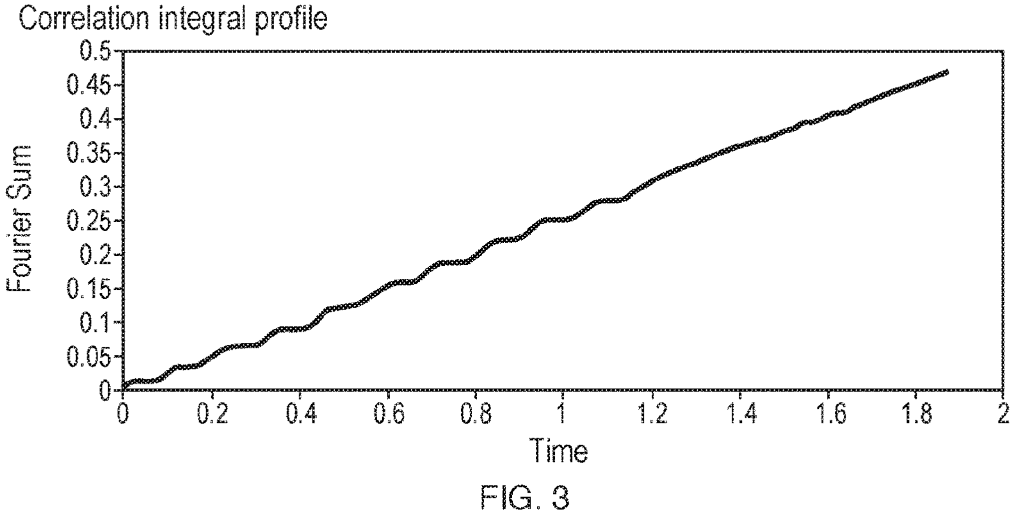
FIG. 3 is a depiction of a STORI plot for a single ion.

The shape of the STORI plot is also useful to reveal the occurrence of ion decay events. In FIG. 4, the STORI plot is shown for a single ion which happens to decay at approximately 1.2 seconds. In the standard Fourier transform, the peak that results from this decayed ion would have a reduced intensity relative to that derived from the Fourier transform of the ion from FIG. 3. This might lead one to believe that the ion of FIG. 4 has a charge that is lower than actuality. However, examination of the STORI plots of FIGS. 3 and 4 show that the slopes of the plots preceding a time point of about 1.2 seconds are the same, and thus both ions have the same charge state. In certain embodiments, STORI plot construction module 217 or charge determination module 220 may contain logic for evaluating the STORI plot and providing an indication to the operator that a decay event has occurred (i.e., responsive to detection of a change of slope across the acquisition period), or may contain logic for disregarding the post-decay portion of the STORI plot when determining charge. In other embodiments, where transient acquisition and m/z and charge determination steps are performed repeatedly for an ion of interest to generate a histogram of the distribution of measured masses, as described above, the STORI plot construction or charge determination module may discard (i.e., not include in the histogram construction) any transients where a change of slope in the STORI plot is observed over the acquisition period.

Visual inspection of the STORI plot depicted in FIG. 3 shows an initially "wiggly" (i.e., oscillating slightly about a straight line) portion, which oscillation substantially disappears after ~1.2 seconds. This wiggly behavior is actually due to the simultaneous presence in the trapping region of the electrostatic trap of the ion corresponding to the STORI plot of FIG. 4, which results in a repeating pattern of constructive and destructive interference. Depending on the point at which the slope is measured during the period of constructive and destructive interference, this can result in an improper estimate of charge state. This can be resolved by considering (i.e., via the operation of charge determination module 220) only the slope corresponding to the portion of the plot after the second ion has decayed, or by more sophisticated processing, where the slope of the STORI plot in FIG. 3 is measured across complete periods of the interference.

Figure 5:
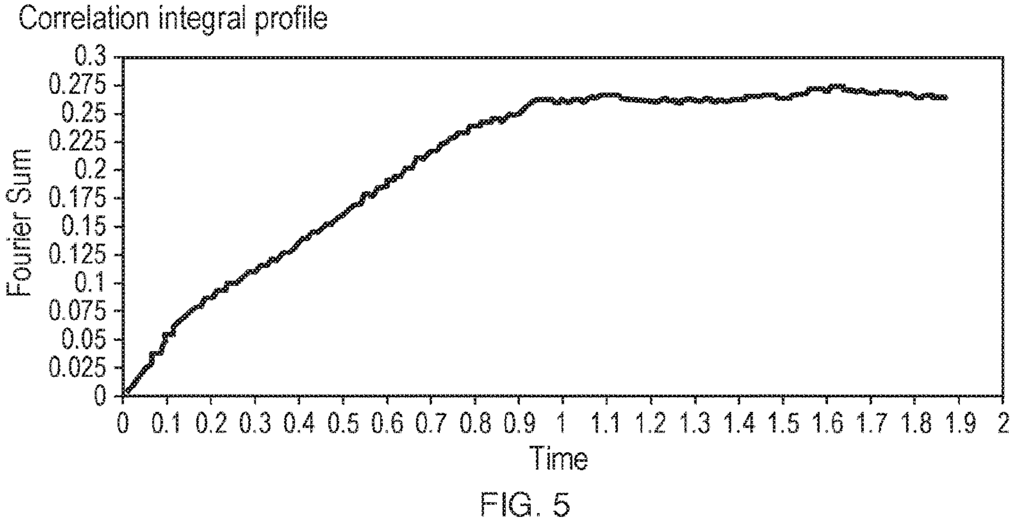
FIG. 5 is a depiction of a STORI plot for two ions, both of which decay during the signal acquisition period.

One potential problem with CDMS in an electrostatic or other harmonic trapping device is the possibility of seeing two ions in the same signal, either because they have the same mass, or because they are close enough in m/z such that they are unresolved during the acquisition period. For the case of two ions of the same m/z, it is difficult to differentiate from the case of one ion with double the charge. FIG. 5 shows a more complicated STORI plot that demonstrates this case. There are initially two ions of the same frequency (or m/z), where the first ion decays after ~0.15 seconds, and the second ion decays after ~0.95 seconds. This information is fairly simple to glean from inspection or processing of the STORI plot, but would be very difficult to extract from standard Fourier transform techniques. In certain implementations, charge determination module 220 may be configured to process the STORI plot generated by plot construction module 217 to determine whether multiple ions having the same mass are present (or non-resolvable ions are present), as indicated by certain characteristics the plot, such as slope variation, and to take appropriate action such as adjusting the determined charge accordingly, or by discarding data from that acquisition when constructing a histogram of the distribution of measured masses.

In sum, the STORI plot may be utilized to determine charge state (both where the ion remains undecayed for the entirety of the acquisition period, to and where ion decay does occur), to evaluate ion decay time, and to differentiate signals generated of multiple ions from that of a single ion.

In another application of the STORI plot technique, the distribution of ion lifetimes of an ion of interest can be determined by repeated transient acquisitions and examination of the resultant STORI plots to identify when the decay event occurred, as evidenced by a change in plot slope. If it can be assumed that the primary cause of ion loss is collisions with background neutrals, and one collision is sufficient to eliminate an ion, one can look at the lifetime distribution and estimate ion collision cross section, in a fashion similar to ion mobility spectrometry.

Alternative Method for STORI Calculation

Described hereinbelow is an alternative method for calculation and construction of the STORI plot, for example by module 217. This method may produce benefits in terms of reducing computational expense and increasing computational speed.

For a transient S and a frequency $\omega_0$, the STORI plot is defined as follows $$\mathrm{STORI}(t)=\int_0^t S(s)\exp(-i\omega_0 s)ds$$

The plot tracks the build-up profile of a single ion at frequency $\omega_0$ over time. One can use the plot to determine the beginning and end of the ion, its modification (e.g., loss of a charge), and most importantly its charge(s) by the slope(s) of the linear region(s) in the plot.

The computation of the STORI plot is straightforward via a simple integration (summation in the discrete case). However, the straightforward approach is time consuming mainly because the computation of $\exp(-i\omega_0 s)$ over many (on the order of 1,000,000) time points is expensive. One can improve the efficiency by integrating over just a subset of time points for the integral (i.e., by decimation). There is, though, a limit to the degree of decimation because the integral, which is a cumulative sum, will accumulate errors over the time.

Disclosed herein is a new method which will allow for an extreme decimation of the integration time range (and the almost complete avoidance of $\exp(-i\omega_0 s)$ evaluation). Since the relevant features from the STORI plots, such as slopes, starts and stops, are slowly varying, decimation, even an extreme one, will not compromise the quality of those features. The efficiency gain, on the other hand, will be significant.

For clarity, let's assume the transient S has just a single frequency, co:

$$S(t)=A(\omega)(\cos(\omega t)+i\sin(\omega t)),$$

where $A(\omega)$ is the amplitude of the single frequency transient.

The STORI reduces to $$\mathrm{Stori}(t)=A(w)\int_0^t(\cos(\omega s)+i\sin(\omega s))\exp(-i\omega 0 s)ds$$

This can be computed analytically as follows, $$STORI(t)=A(\omega)\int_0^t \cos(\omega s)\cos(\omega_0 s)+\sin(\omega s)\sin(\omega_0 s)+i(\sin(\omega s)\cos(\omega_0 s)-\cos(\omega s)\sin(\omega_0 s))ds=\frac{A(\omega)}{2}\int_0^t\cos((\omega-\omega_0)s)+i\sin((\omega-\omega_0)s)ds$$

Performing the integral gives $$STORI(t)=\frac{A(\omega)}{2(\omega-\omega_0)}(\sin(\omega-\omega_0)t+i(1-\cos(\omega-\omega_0)t)$$

We can now easily extend the above equation to where the signal is a sum of signals with different ω's:

$$S(t)=\int A(\omega)(\cos(\omega t)+i\sin(\omega t))d\omega,$$

where $A(\omega)$ is now just the Fourier transform of S(t). The STORI then becomes $$STORI(t)=\frac{1}{2}\int A(\omega)\frac{\sin(\omega-\omega_0)t+i(1-\cos(\omega-\omega_0)t)}{\omega-\omega_0}d\omega$$

Changing the integration variable from ω to $\omega-\omega_0$, we have, $$STORI(t)=\frac{1}{2}\int A(\omega+\omega_0)\frac{\sin(\omega t)+i(1-\cos(\omega t))}{\omega}d\omega$$

For further simplification, let's define $$G(\omega,t)=\frac{\sin(\omega t)+i(1-\cos(\omega t))}{2\omega}$$

Then we have $$\mathrm{STORI}(t)=\int A(\omega+\omega_0)G(\omega,t)d\omega$$

Of conceptual interest, one recognizes that the above is just a convolution of A with G, and where G is but the Fourier transform of the Heavyside function H(t,s), $$H(t,s)=\begin{cases}1 & \text{for } s<t\\ 0 & \text{for } s>t\end{cases}$$

For efficiency consideration, the crucial thing to notice is that the dependency on $\omega_0$ is restricted entirely to the function A, the Fourier transform of S. Thus, the function G can be precomputed and cached for a targeted sequence of time points (say 1024 evenly spaced points over the whole time range of interest). For any frequency of interest, $\omega_0$, we can reuse the cached G function to compute the convolution integral.

Finally, we know that around a peak frequency $\omega_0$, $A(\omega)$ falls off very sharply, and that G dies out from 0 very quickly as $1/\omega$. Thus, the STORI convolution integral only needs to be computed over a very small range of ω (typically smaller than +/−100); incidentally, this also implies that G needs only to be computed and cached for a small number of points in co. Using the example of 1024 target time points and +/−100 frequency points, the computation of a complete STORI plot .requires just 1024*200 complex multiplications, which can be accomplished on a millisecond time scale on any modern CPU. One can go to an even more extreme decimation, say 256 instead of 1024 time points, for faster execution without degrading the quality of the STORI plot.

Alternatives to Orbital Electrostatic Trap

While the invention has been described above and depicted in the drawings in connection with its implementation in an orbital electrostatic trap having a quadro-logarithmic trapping field, it should be understood that this implementation is described by way of an illustrative rather than a limiting example. The invention may be implemented in any electrostatic trap or equivalent structure in which the confined ions undergo harmonic motion along a longitudinal axis, including traps in which the ions do not undergo orbital motion. An example of a non-orbital electrostatic trap that may be suitable for implementation of the present invention is the Cassinian trap described in Köster, "The Concept of Electrostatic Non-Orbital Harmonic Ion Trapping", International Journal of Mass Spectrometry, V. 287, pp. 114-118 (2009), which is incorporated herein by reference.

Deviation from Pure Harmonic Motion

One of ordinary skill in the art will recognize that due to small field faults arising from (for example) electrode machining tolerances, component misalignment, electrical noise and electrode truncation, the ions' motion along the longitudinal axis of the electrostatic trap or equivalent structure may exhibit slight deviation from purely harmonic (e.g., single-frequency sinusoidal) motion. However, such slight departures from pure harmonicity, which will occur in any real-world device, will not substantially reduce the performance of the methods outlined above for derivation of an ion's m/z and charge state. Thus, the term "harmonic", as recited in the following claims, should be construed to encompass cases where small, operationally insubstantial departures from pure harmonic motion exist.

What is claimed is:

1. Apparatus for determination of a mass-to-charge ratio (m/z) and a charge of an ion, comprising:

an electrostatic trap having a plurality of electrodes and a voltage source for applying a set of non-oscillatory voltages to the plurality of electrodes, the plurality of electrodes being shaped and arranged to establish an electrostatic trapping field within the electrostatic trap that causes the ion to undergo harmonic motion along a longitudinal axis;

a detector that generates a time-varying signal responsive to a current induced on the detector by the harmonic motion of the ion; and a data system having logic for:

processing the time-varying signal to derive a frequency of harmonic motion and to determine the m/z from the derived frequency;

generating a Selective Temporal Overview of Resonant Ion (STORI) plot of the variation of $STORI_{MAG}$ versus time, in accordance with the equations:

$$STORI_{MAG}(t_n)=((STORI_{REAL}(t_n))^2+(STORI_{IMAG}(t_n))^2)^{1/2}$$

$$STORI_{REAL}(t_n)=S(t_n)*\sin(\omega*t_n)+STORI_{REAL}(t_{n-1})$$

and $$STORI_{IMAG}(t_n)=-S(t_n)*\cos(\omega*t_n)+STORI_{IMAG}(t_{n-1}),$$

where $S(t_n)$ is the amplitude of the discretized time-varying signal at time point $t_r$, and ω is the derived frequency of harmonic motion; and determining the charge of the ion based in accordance with a stored relation between ion charge and STORI plot slope.

2. The apparatus of claim 1, wherein the plurality of electrodes includes an inner electrode elongated along the axis and an outer electrode radially surrounding the inner electrode, and wherein the electrostatic field is established in the annular space between the inner and outer electrodes.

3. The apparatus of claim 2, wherein the inner and outer electrodes are shaped and arranged such that the electrostatic field has a potential distribution U(r,z) that approximates the relation:

$$U(r,z)=\frac{k}{2}\left(z^2-\frac{r^2}{2}\right)+\frac{k}{2}*(R_m)*\ln\left(\frac{r}{R_m}\right)+C$$

where r is the position of the ion along the radial axis, z is the position of the ion along the central axis, k is the field curvature, C is a constant, and Rm is a characteristic field radius.

4. The apparatus of claim 2, wherein the outer electrode is split along a transverse plane of symmetry of the electrostatic trap into first and second parts, and the detector comprises a differential amplifier connected between the first and second parts.

5. The apparatus of claim 1, further comprising an ion store in which the ion is trapped and thereafter released on an ion path toward an inlet of the electrostatic trap.

6. The apparatus of claim 1, wherein the data system is configured to apply a Fourier transform to the time-varying signal to construct a frequency spectrum.

7. The apparatus of claim 1, wherein the data system further includes logic for visually displaying the STORI plot.

8. The apparatus of claim 1, wherein the data system further includes logic for analyzing the STORI plot to identify an ion decay event.

9. A method for determining a mass-to-charge ratio (m/z) and a charge of an ion of interest, comprising:

(a) injecting an ion population including the ion of interest into a trapping region and establishing an electrostatic trapping field within the region that causes the ion population to undergo harmonic motion along a central axis;

(b) generating a time-varying signal representative of a current induced on a detector by the harmonic motion of the ion population;

(c) processing the time-varying signal to derive a frequency of the induced current;

(d) determining the m/z of the ion of interest from the derived frequency;

(e) generating a generate a Selective Temporal Overview of Resonant Ion (STORI) plot of the variation of $STORI_{MAG}(i)$ versus time, in accordance with the equations:

$$STORI_{MAG}(t_n)=((STORI_{REAL}(t_n))^2+(STORI_{IMAG}(t_n))^2)^{1/2}$$

$$STORI_{REAL}(t_n)=S(t_n)*\sin(\omega*t_n)+STORI_{REAL}(t_{n-1})$$

and $$STORI_{IMAG}(t_n)=-S(t_n)*\cos(\omega*t_n)+STORI_{IMAG}(t_{n-1}),$$

where $S(t_n)$ is the amplitude of the time varying signal at time point $t_n$ and ω is the derived frequency of harmonic motion; and (f) determining the charge of the ion based in accordance with a stored relation between ion charge and STORI plot slope.

10. The method of claim 9, wherein the electrostatic field is established in an annular region between an inner electrode and an outer electrode radially surrounding the inner electrode, and wherein the electrostatic trapping field has a potential distribution U(r,z) that approximates the relation:

$$U(r,z)=\frac{k}{2}\left(z^2-\frac{r^2}{2}\right)+\frac{k}{2}*(R_m)*\ln\left(\frac{r}{R_m}\right)+C$$

where r is the position of the ion along the radial axis, z is the position of the ion along the central axis, k is the field curvature, C is a constant, and Rm is a characteristic field radius.

11. The method of claim 9, wherein the step of processing includes applying a Fourier transform to the time-varying signal.

12. The method of claim 9, wherein the ion of interest is one of: a protein, a protein complex, and a viral capsid.

13. The method of claim 9, wherein the ion of interest is a high molecular weight polymer.

14. The method of claim 9, further comprising performing repeated cycles of steps (a)-(f) and collecting the determined m/z and charge of the ion of interest for each cycle.

15. The method of claim 14, further comprising a step of constructing a histogram of calculated masses of the ion of interest from the collected determined m/z's and charges of the ion of interest.

16. The method of claim 9, wherein the ion population includes a second ion of interest, and further wherein the step of processing the time varying signal derives a first frequency of the ion of interest and a second frequency of the second ion of interest, and further including:

determining the m/z of the second ion of interest from the second frequency;

constructing a second STORI plot for the second ion of interest; and determining the charge of the second ion of interest from the slope of the second STORI plot.

17. The apparatus of claim 1, further comprising ion optics located in an ion path upstream of the electrostatic trap configured to attenuate the beam of ions directed toward the electrostatic trap.

18. The method of claim 9, further comprising a step of attenuating a beam of ions directed toward the trapping region.

19. The method of claim 9, wherein the ion population is confined in an ion store prior to injection into the trapping region.

20. The method of claim 9, further comprising a step of evaluating the STORI plot to evaluate whether an ion decay event has occurred.

21. The method of claim 9, further comprising a step of displaying the STORI plot.

22. The apparatus of claim 1, wherein the logic for generating the STORI plot includes instructions for precomputing and caching the function G(ω, t) for a sequence of targeted time points, where G(ω,t) is the Fourier transform of the Heavyside function H(t,s), $$H(t, s) = \begin{cases} 1 \text{ for } s < t \\ 0 \text{ for } s > t \end{cases}$$

23. The method of claim 9, wherein the step of generating the STORI plot includes precomputing and caching the function G(ω, t) for a sequence of targeted time points, where G(ω,t) is the Fourier transform of the Heavyside function H(t,s), $$H(t, s) = \begin{cases} 1 \text{ for } s < t \\ 0 \text{ for } s > t \end{cases}$$

* * * * *